US012709780B2

(12) United States Patent
Ohodnicki et al.

(10) Patent No.: US 12,709,780 B2
(45) Date of Patent: Aug. 18, 2026

(54) SPATIALLY SELECTIVE ELECTROMAGNETIC FIELD ASSISTED PROCESSING OF BULK CRYSTALLINE SOFT MAGNETIC ALLOYS

(71) Applicant: UNIVERSITY OF PITTSBURGH—OF THE COMMONWEALTH SYSTEM OF HIGHER EDUCATION, Pittsburgh, PA (US)

(72) Inventors: Paul Ohodnicki, Allison Park, PA (US); Ahmed Talaat, Pittsburgh, PA (US); Tyler Paplham, Getzville, NY (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 382 days.

(21) Appl. No.: 18/568,640

(22) PCT Filed: Jun. 30, 2022

(86) PCT No.: PCT/US2022/035687
§ 371 (c)(1),
(2) Date: Dec. 8, 2023

(87) PCT Pub. No.: WO2023/278674
PCT Pub. Date: Jan. 5, 2023

(65) Prior Publication Data

US 2024/0271236 A1 Aug. 15, 2024

Related U.S. Application Data

(60) Provisional application No. 63/216,614, filed on Jun. 30, 2021.

(51) Int. Cl.
*C21D 1/42* (2006.01)
*C21D 6/00* (2006.01)
(Continued)

(52) U.S. Cl.
CPC ................ *C21D 1/42* (2013.01); *C21D 6/00* (2013.01); *C21D 9/0068* (2013.01);
(Continued)

(58) Field of Classification Search
None
See application file for complete search history.

(56) References Cited

U.S. PATENT DOCUMENTS

2003/0113582 A1 6/2003 Litvinov et al.
2020/0263281 A1 * 8/2020 Plotkowski .............. B22F 5/10

FOREIGN PATENT DOCUMENTS

CN 105719826 A 6/2016

OTHER PUBLICATIONS

International Search Report from PCT/US2022/035687, mailed Oct. 13, 2022.

* cited by examiner

*Primary Examiner* — Anthony M Liang
(74) *Attorney, Agent, or Firm* — Carol Marmo; Eckert Seamans Cherin & Mellott, LLC

(57) ABSTRACT

The disclosed concept pertains to a method of processing soft magnetic alloys, and, in particular, a method of processing soft magnetic alloys using a spatially selective heating technique comprising electromagnetic field assisted thermal processing in order to spatially vary the magnetic and mechanical properties within the alloy in a selective manner. The disclosed concept includes a thermal processing method that includes providing a soft magnetic alloy component, and applying an electromagnetic field to the (Continued)

component that generates heat internally within the component in a spatially varying manner to cause a number of magnetic properties and mechanical properties of the soft magnetic alloy to vary spatially within the component.

20 Claims, 9 Drawing Sheets

(51) Int. Cl.
*C21D 9/00* (2006.01)
*H01F 1/147* (2006.01)
*H01F 41/02* (2006.01)
*H02K 15/02* (2025.01)

(52) U.S. Cl.
CPC ......... *H01F 1/14766* (2013.01); *H01F 41/02* (2013.01); *C21D 2221/00* (2013.01); *H02K 15/02* (2013.01)

Temperature (C)

130 A 200 kHz 100 um

SPATIALLY SELECTIVE ELECTROMAGNETIC FIELD ASSISTED PROCESSING OF BULK CRYSTALLINE SOFT MAGNETIC ALLOYS

This patent application is a U.S. National Phase of International Application No. PCT/US2022/035687, filed Jun. 30, 2022 which claims priority under 35 U.S.C. 119(e) from U.S. Provisional Patent Application No. 63/216,614, filed Jun. 30, 2021, entitled "SPATIALLY SELECTIVE ELECTROMAGNETIC FIELD ASSISTED PROCESSING OF BULK CRYSTALLINE SOFT MAGNETIC ALLOYS", the contents of each which are incorporated herein by reference.

FIELD OF THE INVENTION

The disclosed concept pertains to a method of processing soft magnetic alloys, and, in particular, a method of processing soft magnetic alloys (used, for example, to make a part for electric motors) using a spatially selective heating technique comprising electromagnetic field assisted thermal processing in order to spatially vary the magnetic and mechanical properties within the alloy in a selective manner.

BACKGROUND OF THE INVENTION

The market for electric motors in electric vehicle (EV) applications is projected to grow at a combined annual growth rate of more than 50% in upcoming years due to the anticipated rapid penetration of EVs. These projections represent broad trends of electrification in the transportation sector at large, demanding new technologies to enable light-weighting of EV and hybrid-electric aircraft for extending range and reducing battery requirements.

One of the main components of an EV is the electric traction motor. The electric traction motor typically represents approximately 5-10% of the overall vehicle weight. Furthermore, the weight of an electric traction motor is dominated by the weight of the soft magnetic alloy laminates that are used to manufacture the rotor and stator of the electric traction motor. As a result, new technologies that reduce the size and retain or increase the efficiency of an electric traction motor can have a major impact on EV technology.

It has been demonstrated that substituting conventional iron-silicon steel alloys with advanced soft magnetic alloys as lamination materials for the motor stator and rotor can significantly impact EV range, maximum torque, and acceleration. However, due to the fundamental nature of the magnetization and mechanical deformation processes, bulk crystalline soft magnetic alloys are well-known to show a trade-off between the magnetic properties thereof, such as core loss and permeability, and the mechanical properties thereof, such as yield strength and hardness. More specifically, grain boundaries and second phase precipitates within the alloy microstructure play an active role in the pinning of both magnetic domain walls and dislocations. Dislocation pinning is well established to increase yield stress of metallic alloys, providing enhanced mechanical strength for demanding applications such as the rotor of electrical motors, which rotate at an angular velocity directly proportional to the torque resulting in substantial radial forces. In contrast, magnetic domain wall pinning produces higher magnetization losses (e.g., core losses) and lower efficiencies, which are highly undesirable in the case of electric motor laminations. Standard design practice, therefore, is to optimize the soft magnetic laminations for the stator (a stationary component) and the rotor separately, through a carefully designed set of thermal processing treatments in controlled gas atmospheres, to allow for the lowest possible core loss while still satisfying mechanical properties (e.g., yield stress) that are required by the part in question (stator or rotor). To achieve enhanced mechanical properties at the expense of magnetic property performance, rotor laminations are typically thermally treated at a lower temperature which retains a finer grain size, while stator laminations are treated at a higher temperature to achieve a larger grain size and lower losses. This conventional strategy typically involves producing rotor laminations which exhibit core losses more than an order of magnitude greater than the stator laminations. A need exists to improve upon this traditional trade-off through advanced manufacturing techniques, to realize, higher efficiency motor laminations satisfying the mechanical property requirements for EV motors.

SUMMARY OF THE INVENTION

In one aspect, the disclosed concept provides a thermal processing method. The method includes providing a component comprising a soft magnetic alloy; applying spatially selective thermal annealing to the component by applying an electromagnetic field to the component, wherein electromagnetic field generates heat internally within the component in a spatially varying manner to cause a number of magnetic properties and a number of mechanical properties of the soft magnetic alloy to vary spatially within the component.

The electromagnetic field may be an RF field, a microwave field or an optical field.

The soft magnetic alloy may be a bulk crystalline soft magnetic alloy. The bulk crystalline soft magnetic alloy may be an iron-cobalt soft magnetic alloy or an electrical steel or an iron silicon soft magnetic alloy.

In certain embodiments, the soft magnetic alloy is in the form of a lamination which is processed prior to stamping or other laminate manufacturing processes such that a radial temperature dependence is preserved during annealing for more complex lamination geometries.

In certain embodiments, the soft magnetic alloy is in the form of a lamination which is processed prior to stamping or other laminate manufacturing processes such that a radial temperature dependence is preserved during annealing for more complex lamination geometries, and for which both a rotor and stator is manufactured from a single lamination by stamping following processing.

The component may be a part of an electric motor. The component may be a rotor or a stator. In certain embodiments, the rotor or the stator is a rotor or stator of an electric traction motor of an electric vehicle. In certain embodiments, the lamination allows for manufacturing of both a rotor and stator through subsequent manufacturing steps.

The electromagnetic field may be applied through a coil member. The coil member may be selected from a wide variety of conventional coil members that are known in the art and include various known geometries. In certain embodiments, the coil member is a helical coil, a split helical coil or a pancake coil.

The thermal processing method may further include providing a static magnetic field adjacent to and/or an applied mechanical field to the component during at least part of the applying of the electromagnetic radiation to generate induced magnetic anisotropies within the component. The thermal processing method may further include providing a static magnetic field adjacent to and/or an applied mechanical field to the component during at least part of the applying of the electromagnetic radiation to generate induced magnetic anisotropies within the component, resulting in generation of a radial induced anisotropy and an easy axis along a primary direction of gap flux. The thermal processing method may further include providing a static magnetic field adjacent to and/or an applied mechanical field to the component during at least part of the applying of the electromagnetic radiation to generate induced magnetic anisotropies within the component, resulting in generation of a transverse induced anisotropy and an easy axis along a primary direction of gap flux. The thermal processing method may further include providing a static magnetic field adjacent to and/or an applied mechanical field to the component during at least part of the applying of the electromagnetic radiation to generate induced magnetic anisotropies within the component, resulting in generation of a spatially varying induced anisotropy and an easy axis that lies along a primary direction of flux within the component.

The component may be a rotor or stator, wherein the coil member is a transverse coil suspended above the rotor or stator, wherein a temperature within the component during the processing is a maximum near the outer or inner diameter of the rotor or stator where the magnetic flux is expected to be largest and decreases away from this region where the magnetic flux is expected to be relatively smaller during operation, and wherein the magnetic and mechanical properties are caused to vary radially. The rotor may be a disk-shaped rotor such as in a surface mounted permanent magnet machine (SPM) and the transverse coil may be a cylindrical transverse coil.

The component may be a rotor, wherein the coil member is a transverse coil suspended above an outer circumference of the rotor, wherein a temperature within the component during the processing is a maximum near the outer diameter of the rotor and decreases approaching an inner diameter of the rotor, and wherein the magnetic and mechanical properties are caused to vary radially. The component may be a disk-shaped lamination and the transverse coil may be a cylindrical transverse coil.

The component may be a stator, wherein the coil member is a transverse coil suspended above an inner circumference of the stator, wherein a temperature within the component during the processing is a maximum near the inner diameter of the stator and decreases approaching an outer diameter of the stator, and wherein the magnetic and mechanical properties are caused to vary radially. The stator may be a periodic tooth-shaped stator. In certain embodiments, the tooth-shaped stator is selected from a surface mounted permanent magnet machine (SPM), an interior mounted permanent magnet machine, and an induction machine, amongst many others. A cylindrical transverse coil may be used, but alternative coil designs may also be used. The transverse coil may be a cylindrical transverse coil.

The rotor and stator laminations may also correspond to axial flux machines rather than radial flux machines, wherein the temperature during annealing is largest for the region of the laminations near the gap where the magnetic flux will also be largest. A wide range of other embodiments and variations may also be envisioned.

The component may include a lamination comprising the soft magnetic alloy.

The number of magnetic properties may include core loss and/or permeability and wherein the number of mechanical properties includes yield strength and/or hardness.

The coil member may be structured such that a coil current in the coil member is localized above one or more regions of the component in which the temperature is to be the largest. The one or more regions of the component may include one or more edges of the component. The one or more regions of the component may also include the regions of the component where the flux density tends to be largest, for example in the region of the lamination lying in closest proximity to the gap during operation of the motor. In certain embodiments, the one or more regions of the component may include the teeth of a stator, or a rotor. The one or more regions of the component may include one or more inner edges of the component.

The coil member may exhibit a spatially varying current coil density.

The electromagnetic field may cause heating and/or cooling within the component at a rate as high as $10^2$-$10^4$ K/s.

The component may be part of an axial motor.

BRIEF DESCRIPTION OF THE DRAWINGS

The disclosed concept is further illustrated by the following drawings, in which.

DETAILED DESCRIPTION

Figure 1A:
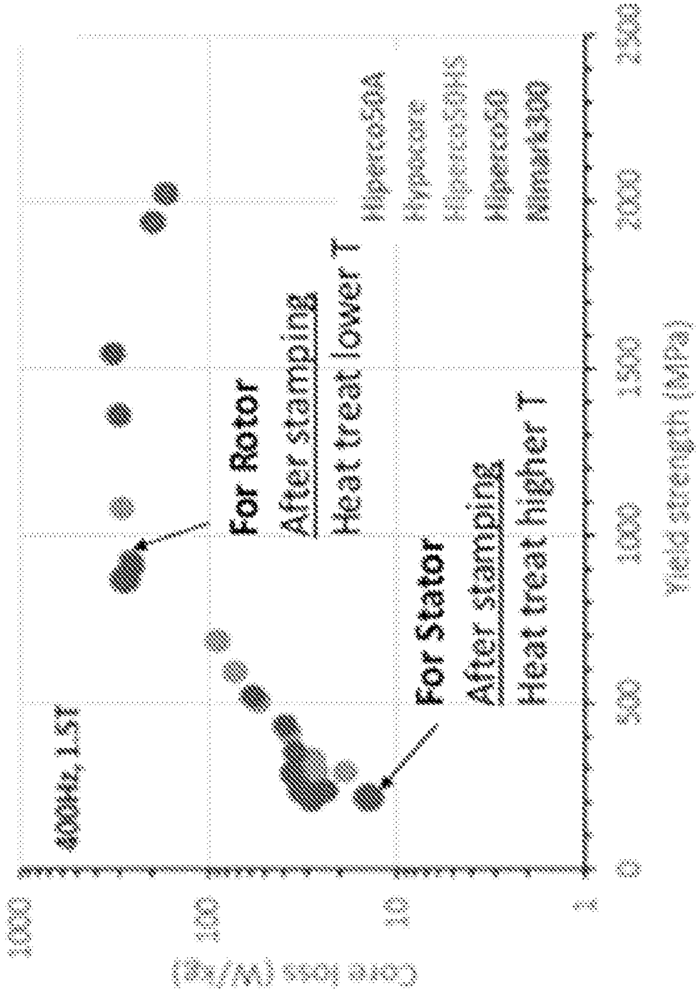
FIG. 1*a* is a schematic illustrating a stator and rotor for a battery electric vehicle application.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject disclosed concept. It will be evident, however, that the disclosed concept can be practiced without these specific details without departing from the spirit and scope of this innovation.

Prior work by a team including one of the present inventors, described in K. Byerly, P. R. Ohodnicki, et al., Metal Amorphous Nanocomposite (MANC) Alloy Cores with Spatially Tuned Permeability for Advanced Power Magnetics Applications, JOM. 70 (2018) 879-891, has demonstrated the potential to improve the performance of large-scale inductors comprised of advanced soft magnetic alloys through a concept known as "permeability engineering", in which the magnetic properties of the material are spatially optimized via advanced manufacturing processing techniques. In these previous efforts, the magnetic permeability of a magnetic core is varied from the inner to the outer diameter to ensure a constant distribution of magnetic flux and core losses throughout an inductor core, yielding significant performance improvements including reduced thermal management requirements as well as higher power densities.

The disclosed concept extends upon this concept of spatially optimized magnetic properties, of specific interest for electric motor applications but also relevant for other stamped/lamination applications as well, by utilizing a new concept in selective heating referred to as electromagnetic field assisted thermal processing. More specifically, applied radio frequency (RF), microwave, and/or optical frequency electromagnetic radiation impacts the processing of bulk crystalline soft magnetic alloys in a number of favorable ways. First, with applied electromagnetic radiation, heat is generated internally within the materials rather than being transferred to it via the surface. This results in unique physical phenomena within the material due to the detailed mechanism of electromagnetic energy absorption, and allows for much more rapid heating rates than traditional processing methods. Second, applied electromagnetic radiation allows for microstructure engineering of the material through the optimization of nucleation vs growth kinetics at extremely high heating and cooling rates. Thus, applied electromagnetic radiation allows for additional capabilities for processing under external stimuli (e.g., magnetic fields, mechanical stresses), which may ultimately demonstrate the potential for precise engineering of magnetic structures/anisotropies and spatially selective property variation. Finally, applied electromagnetic radiation allows for new concepts and design methods for advanced motor/power components by providing for the spatially selective thermal annealing of such components (e.g., the parts for the rotor and stator of an electrical machine), thereby enabling an optimized tradeoff between yield strength and magnetic properties.

In particular, thermal annealing is a typical processing stage or method that is used to alter the magnetic properties of bulk crystalline alloys (e.g., Fe—Co, Fe—Ni, Fe—Si alloys). Traditional annealing methods, however, involve heating samples in a controlled atmosphere at relatively low heating rates (~10-20 K/s). As noted elsewhere herein, however, for the successful development of certain applications (e.g., EV motor components), it is often necessary to conduct an engineering trade-off that involves synergies between magnetic and mechanical behavior (and electrical loss), where thermal processing plays a major role in determining nucleation and growth under selected annealing temperatures and application relevant measurement conditions.

The capabilities of electromagnetic heating just described therefore provide an attractive and viable path to exploit unprecedented properties arising from direct internal heating through induced eddy currents and other sources of dissipative losses during electromagnetic field excitation. This enables localized and well-controlled thermal profiles for tailoring the tradeoff between mechanical and magnetic properties spatially throughout a given fabricated component. Furthermore, extremely high heating and cooling rates (e.g., on the order of $10^3$-$10^4$ K/s) attainable through electromagnetic field processing and advanced manufacturing techniques offer unique microstructures developed under accelerated kinetics that are not otherwise achievable by traditional annealing methods.

Thus, as described in detail herein, the disclosed concept utilizes electromagnetic radiation (e.g., RF radiation) induction-based heating to selectively post-process parts, such as rotor laminations, made from soft magnetic alloys, such as, without limitation, the advanced iron-cobalt soft magnetic alloys described elsewhere herein, to realize a spatially varying distribution of magnetic and mechanical properties (e.g., magnetic core losses and/or permeability, and mechanical yield strength and/or hardness). Ultimately, the disclosed concept allows for the utilization of rapid and spatially selective thermal processing for improved alloy homogeneity and increased grain sizes in regions of the parts in question (e.g., motor laminations) for which the magnetization processes are dominant, while retaining enhanced mechanical properties for regions which are primarily serving to provide the parts in question (e.g., motor laminations) with mechanical strength and durability.

Simulations were performed using Comsol multi-physics to show the following unique aspects of the disclosed concept. The disclosed concept has the ability to control the local temperature of a bulk crystalline alloy (e.g., Hiperco) using a custom-designed RF induction coil at a steady state excitation condition. In addition, the disclosed concept has the ability to maintain a steady state temperature in the range where bulk crystalline alloys are thermally treated to optimize their magnetic and structural properties. Further, the disclosed concept has the ability to tailor the temperature distribution at steady state such that the balance between the mechanical properties (i.e., yield stress) and the magnetic properties (i.e., core loss) is spatially tuned for improved performance of components such as laminations for rotors.

Figure 1B:
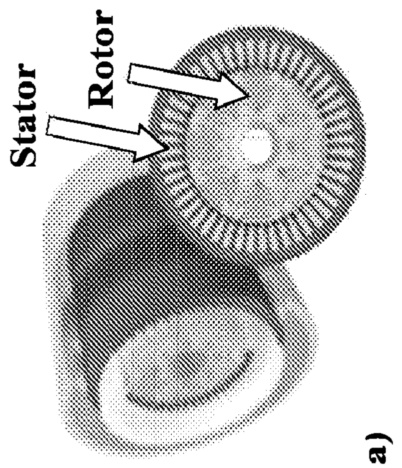
FIG. 1*b* is a Pareto-front highlighting core loss and yield strength tradeoff, in accordance with the prior art.

FIGS. 1*a* and 1*b* illustrate a component for which spatially optimized thermal treatments and properties are beneficial, wherein simulations of permanent magnet based electric motors are shown. FIG. 1*a* illustrates an integrated permanent magnet motor, including a stator and rotor, e.g., for battery electric vehicle or electric traction motor applications. FIG. 1*b* shows the tradeoff between core loss and yield strength for FeCo-bulk crystalline alloys for different thermal processing conditions. Core loss and yield strength trade-off is shown which drives higher losses of the overall motor design to achieve required mechanical properties for the rotor. To achieve enhanced mechanical properties at the expense of magnetic property performance, rotor laminations are typically thermally treated at a lower temperature which retains an inner grain size, while rotor laminations are treated at a higher temperature to achieve a larger grain size and lower losses.

Figure 2A:
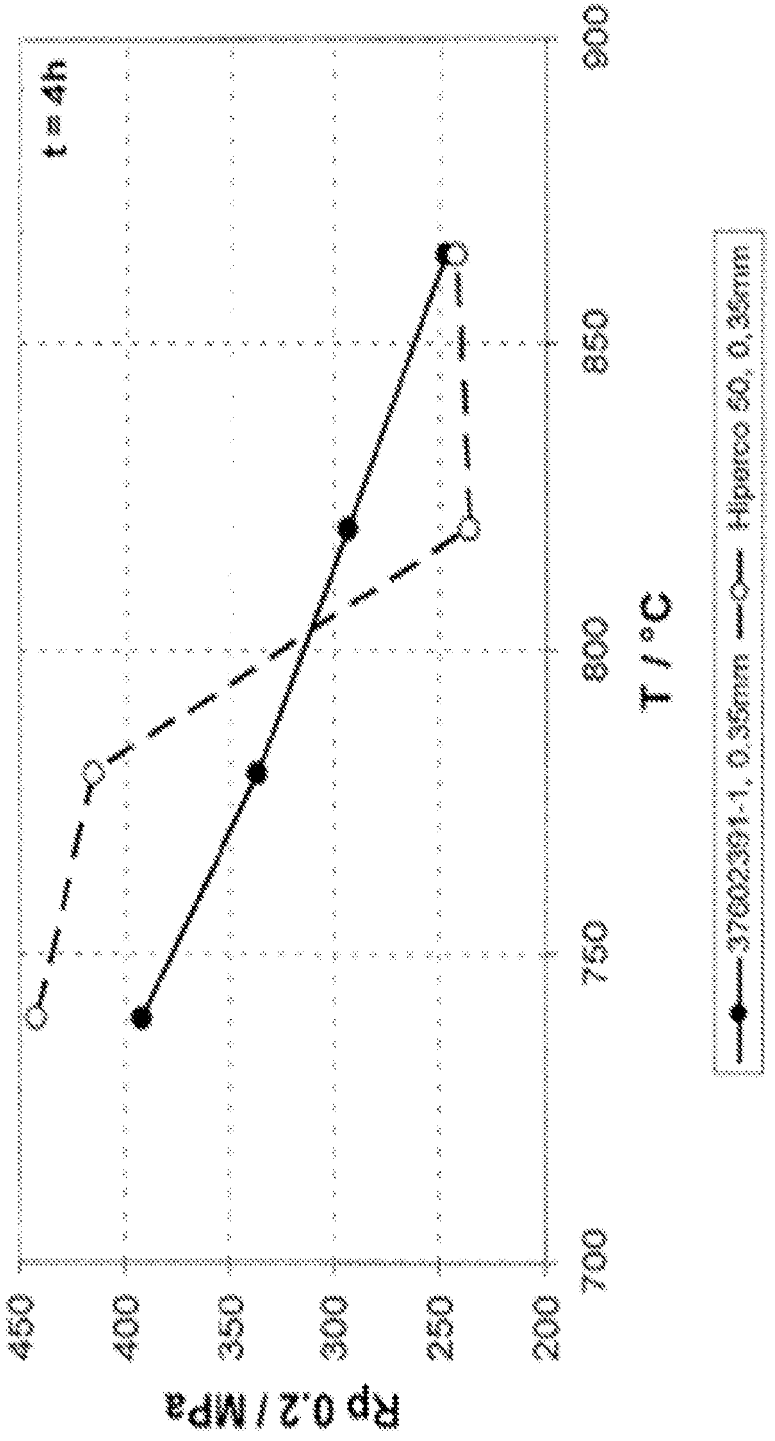
FIG. 2*a* is a plot illustrating yield strength (in MPa) as a function of thermal annealing temperature for iron-cobalt (FeCo)-based alloys.
Figure 2B:
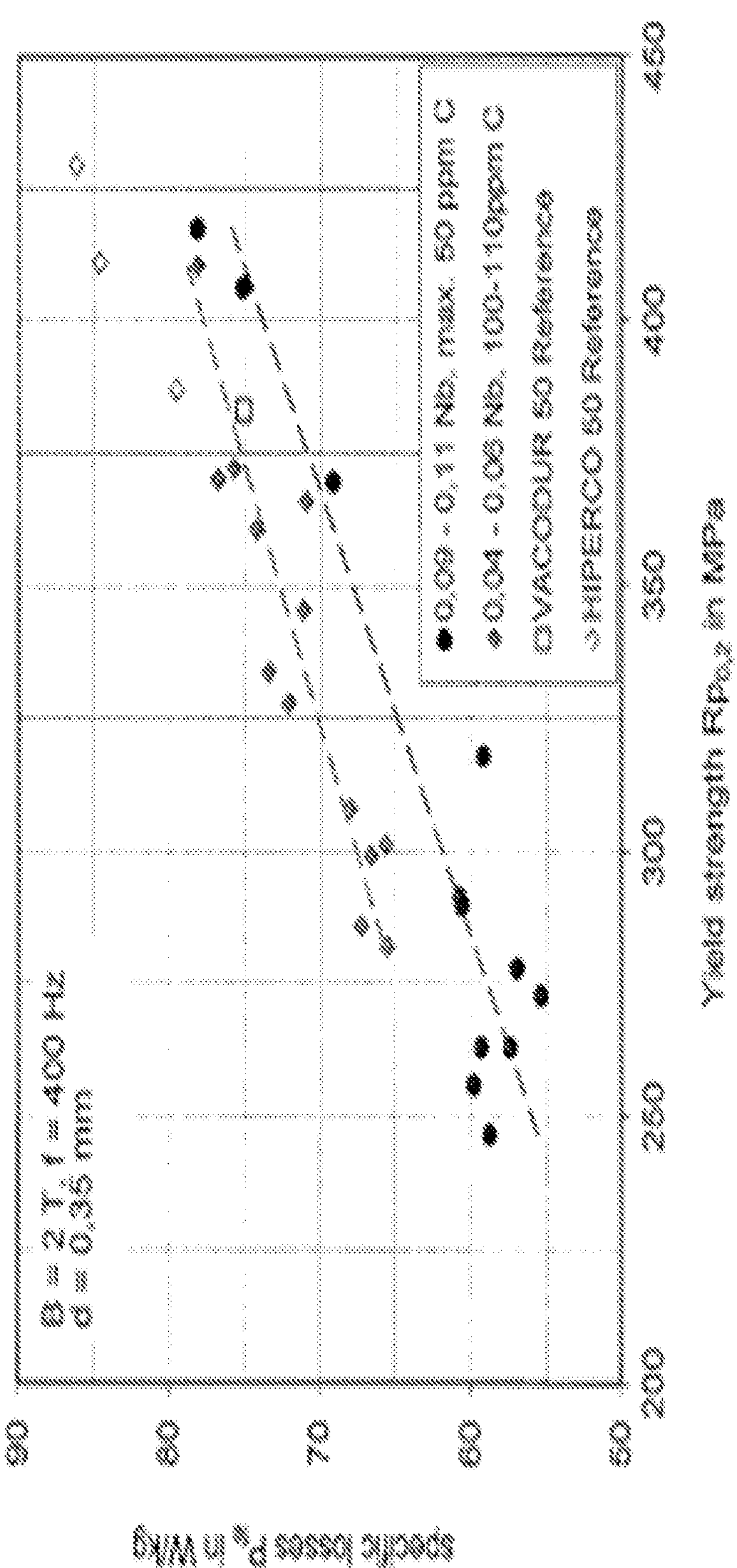
FIG. 2*b* is a plot illustrating specific core losses at 400 Hz as a function of yield strength.
Figure 2C:
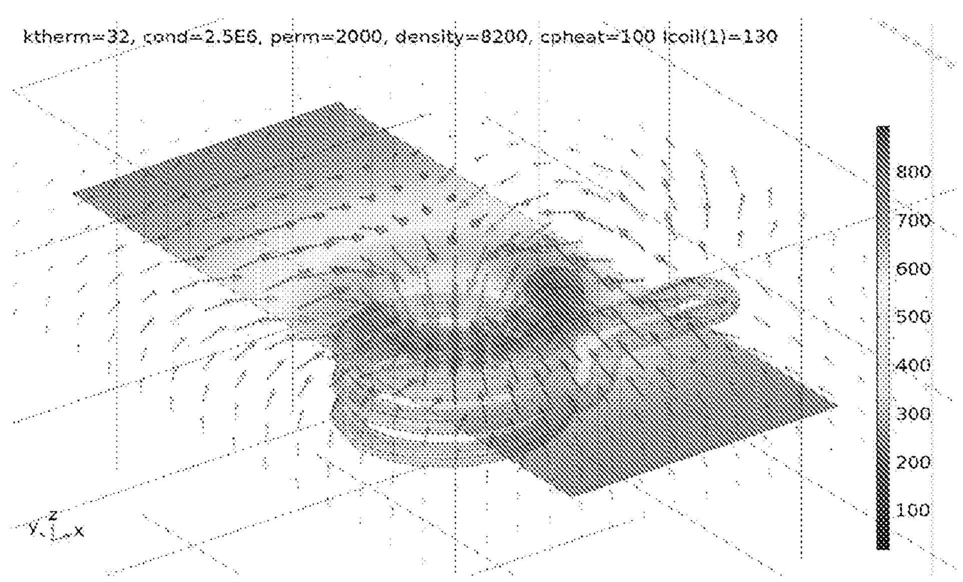
FIG. 2*c* is an image illustrating multi physics simulations of the RF processing of an FeCo-bulk laminate using a perpendicular RF coil showing steady state temperature ranging from 500 to 900° C.
Figure 2D:
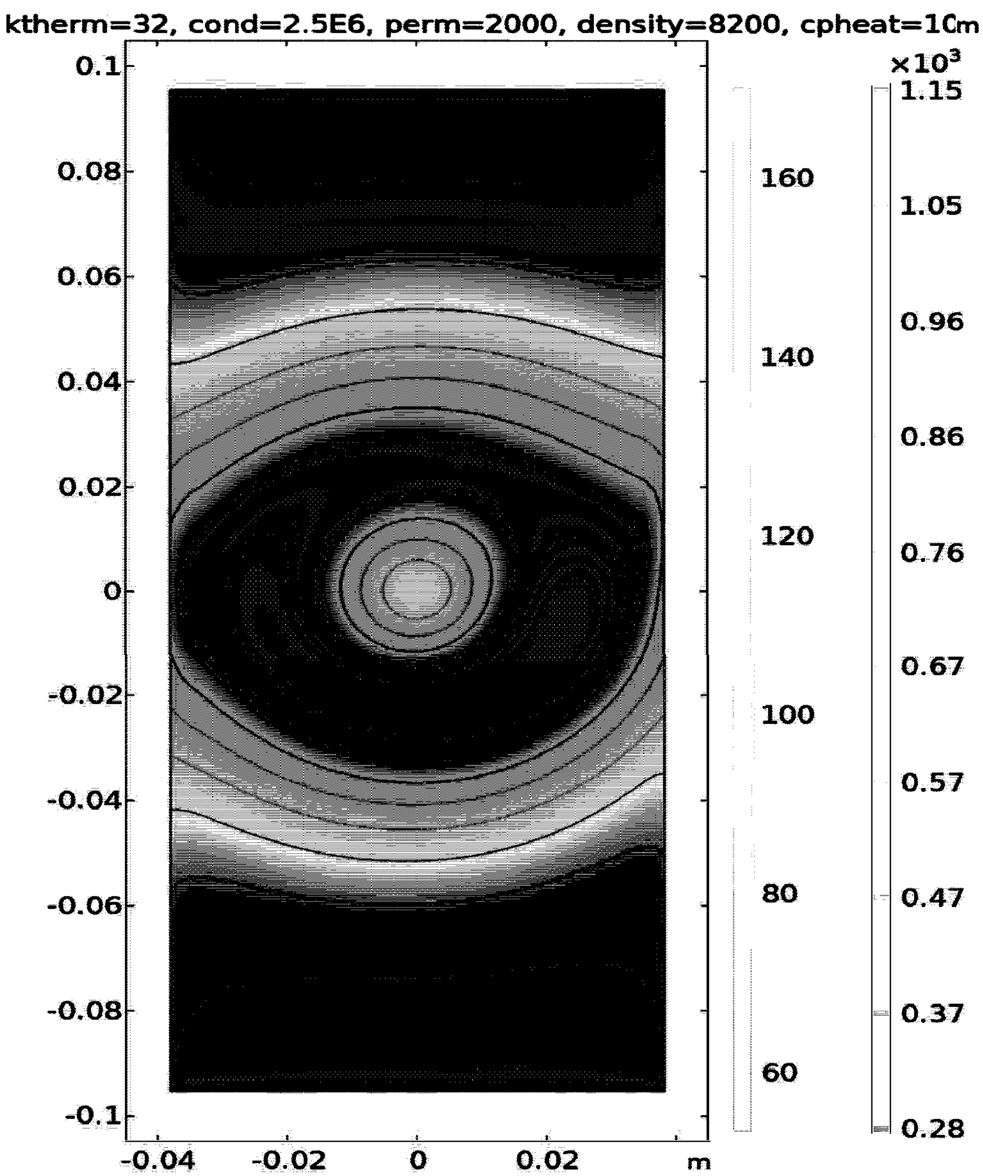
FIG. 2*d* is an image illustrating specific losses and yield strength as a function of position due to the thermal distribution in FIG. 2*c*, according to certain embodiments of the disclosed concept.

In accordance with certain embodiments, FIGS. 2*a*, 2*b*, 2*c* and 2*d* illustrate examples of experimentally measured trends in FeCo-based bulk crystalline alloys clearly showing an approximately linear relationship between yield strength and thermal annealing temperature, as well as between the specific core loss and yield strength. FIG. 2*a* illustrates yield strength (in MPa) as a function of thermal annealing temperature, and FIG. 2*b* illustrates specific core losses at 400 Hz (relevant for aerospace electric motors) as a function of yield strength showing the trade-off between magnetic and mechanical properties. Using these experimentally derived relationships, multi physics simulations were performed to predict the steady state temperature distribution attainable using a simple perpendicular RE induction coil. FIG. 2*c* illustrates the multi physics simulations of the RF processing of the FeCo-bulk laminate using a perpendicular RF coil showing steady state temperature ranging from 500 to 900° C. The distribution of specific loss and yield strength that would be expected for the spatially varying temperature distribution is shown in FIG. 2*d* which illustrates specific losses (shaded map) and yield strength (contours) as a function of position due to the thermal distribution in FIG. 2*c*. FIG. 2*d* clearly demonstrates the ability to locally control the trade-off between the mechanical and magnetic properties, thereby allowing to increase the efficiency of laminations while also retaining the necessary mechanical strength.

Figures 3A, 3B:
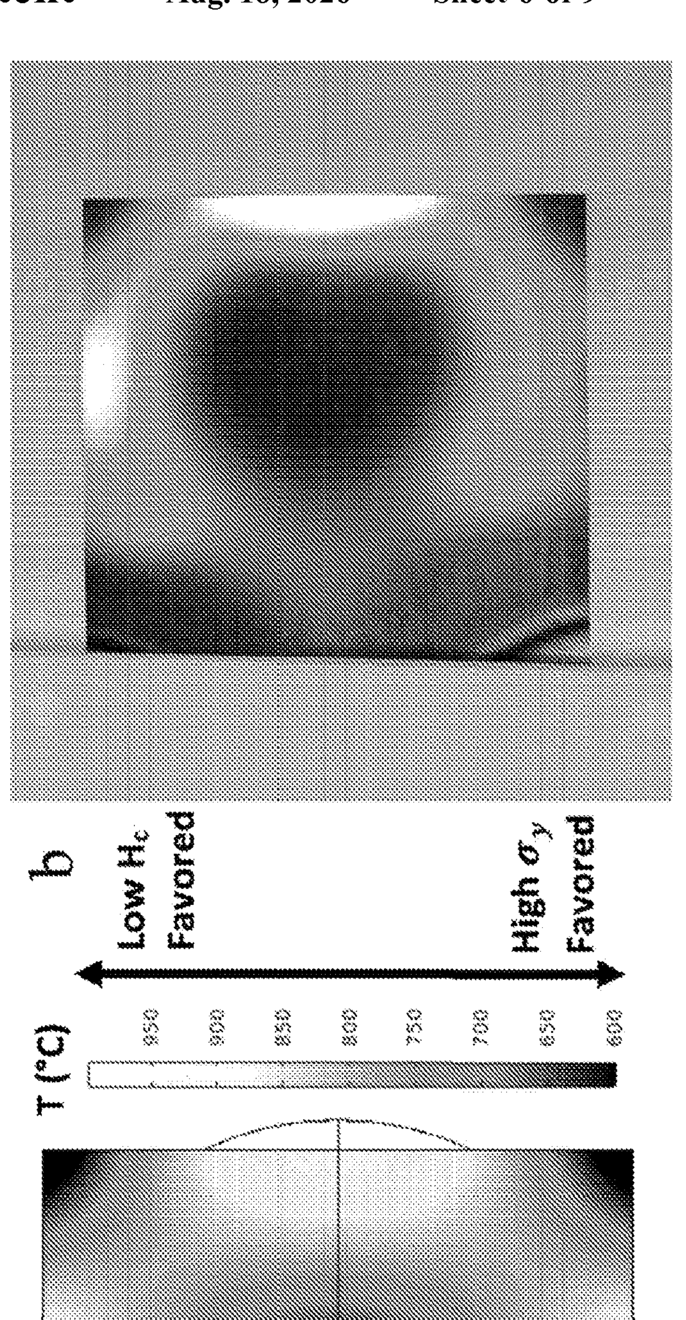
FIG. 3*a* is an image illustrating multi physics simulations of the RF processing of an FeCo-bulk square laminate using a perpendicular cylindrical RF coil.
FIG. 3*b* is a photograph taken of the experimental RF processing of an FeCo-bulk laminate using a perpendicular cylindrical RF coil demonstrating the a spatial temperature variation as in FIG. 3*a*.

FIGS. 3*a* and 3*b* illustrate that the temperature profiles predicted by the multi physics simulations closely match the temperature profile observed in experiment. FIG. 3*a* illustrates a multi physics simulation of the temperature profile for a square FeCo-bulk laminate annealed using a perpendicular cylindrical RF induction coil. FIG. 3*b* is a photograph of a square FeCo-bulk laminate being annealed using a perpendicular cylindrical RF induction coil. The multi physics simulation is seen to provide a good predictor of the temperature profiles achievable in practice.

RF Induction Coil and Materials

Figures 4A, 4B:
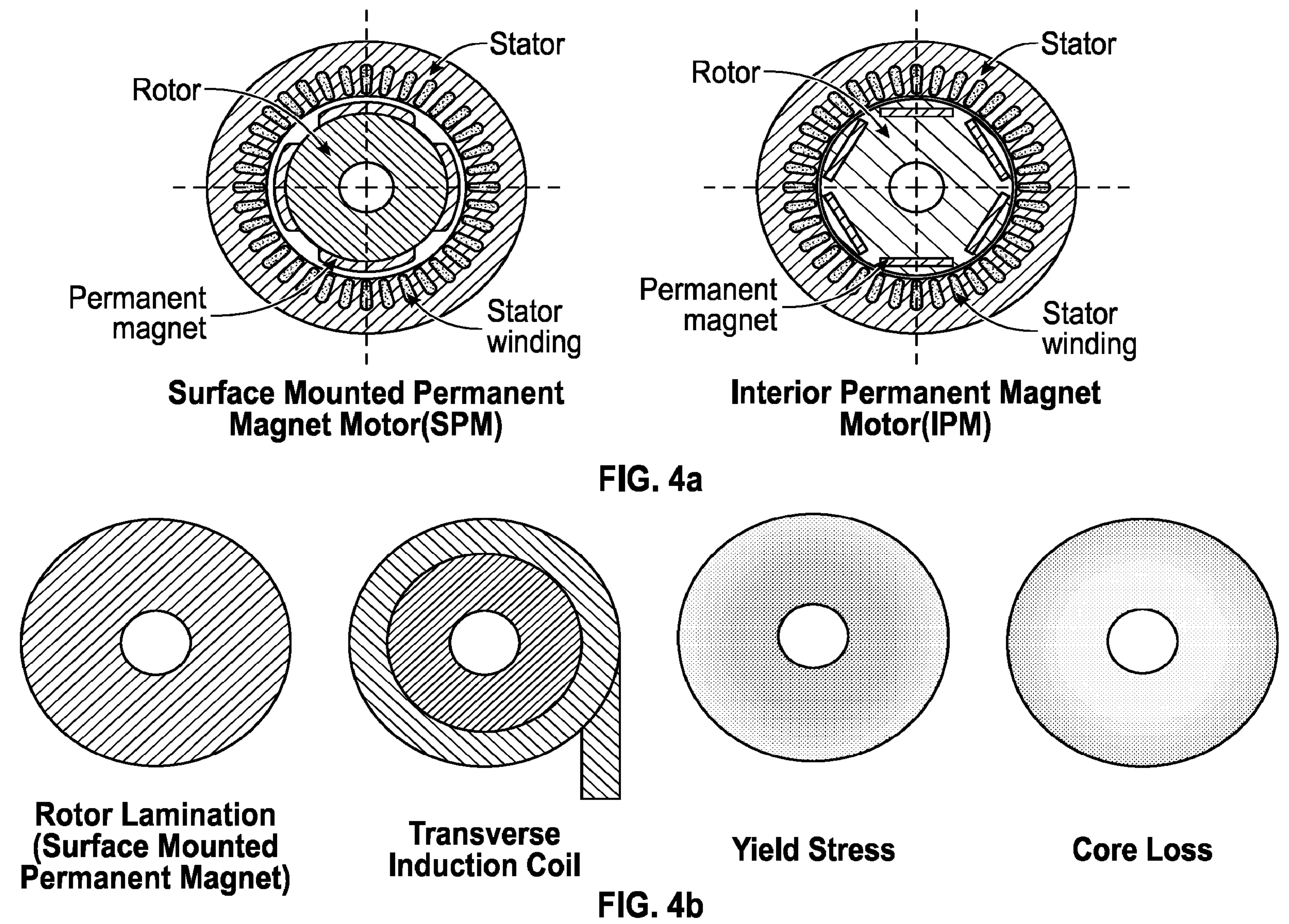
FIG. 4*a* is an image illustrating a surface mounted permanent magnet (SPM) and interior mounted permanent magnet (IPM) motor designs.
FIG. 4*b* is a schematic illustrating the processing of an SPM motor lamination to produce a lower magnetic loss at the outer diameter and higher yield stress at the inner diameter, in accordance with certain embodiments of the disclosed concept.

The successful implementation of the disclosed concept relies upon the details of the electromagnetic properties of the materials and the RF coil design specific to the motor topology (e.g. cylindrical motors, switched reluctance motors, etc.) including both parts, the rotor and stator, to enable spatially optimized trade-off between magnetic and mechanical properties. In particular, the generation of heat within the material and its uniformity depend on the degree of skin effect and electromagnetic field constraints (eddy currents and flux orientation) mainly at edges of processed laminations. These parameters are linked to the coil geometry which additionally causes certain electromagnetic phenomena such as proximity effects upon varying the spatial distancing between the coil and lamination. Furthermore, techniques for integration of static magnetic fields (e.g. permanent magnets or electromagnets) with the RF induction coil annealing approach are developed to explore potential for induced magnetic anisotropies to be generated within the materials during the RF processing stage, and for tailoring the distribution of EM within the lamination through modifying the magnetization state and effectively modifying losses and/or yield stresses. Some specific examples of embodiments include:

1) Generating a radial dependence of magnetic properties (losses/permeability) and mechanical properties (yield stress) such that the outer portion of a motor lamination in proximity to the region with larger magnetic flux density has reduced magnetic losses while the inner portion of the rotor benefits from enhanced mechanical properties. In this way, magnetic losses are substantially reduced but mechanical integrity of the motor is preserved during operation. An example of a coil configuration that accomplishes such a radial dependence is a cylindrical transverse coil in which the coil is suspended above the outer circumference of the lamination. In case of motor designs such as a surface mounted permanent magnet motor, rotor laminations are often solid circular disks for which this type of a simple coil and approach is highly appropriate. As an example, FIG. 4*a* illustrates both a surface mounted permanent magnet (left) and internal permanent magnet (right) motor. In the former case, the rotor is a circular disk in which the magnetic field strength is strongest at the outer rotor diameter during operation. An example illustration of a transverse induction coil thermal process is illustrated in FIG. 4*b*, in which a transverse coil is suspended above the outer diameter of the rotor creating a temperature that is a maximum near the outer diameter and which decreases approaching the inner diameter. Because the magnetic flux density is greatest at the outer rotor surface, this design enables improved utilization of the rotor with lower losses. In the case of an IPM motor (FIG. 4*a*, right), the additional voids within the lamination can produce local temperature variations because of the tendency for eddy currents to be impacted as a result of the edges of sample laminations, as also seen in FIGS. 3*a* and 3*b*. Again, this can be leveraged in order to produce peak temperatures during annealing in regions where the magnetic flux density is expected to be greatest, hence providing a significant benefit in terms of loss reductions. In this way, relatively simple coil configurations combined with enhancement of eddy currents and peak temperatures near lamination edges, are used to locally enhance magnetic properties in regions where magnetic flux is concentrated within the motor laminations.

2) Generating a radial dependence of magnetic properties (losses/permeability) and mechanical properties (yield stress) such that the inner portion of a rotor has reduced magnetic losses while the outer portion of the rotor benefits from enhanced mechanical properties. In this way, magnetic losses are substantially reduced but mechanical integrity of the stator is preserved during operation. An example of a coil configuration that accomplishes such a radial dependence is a cylindrical transverse coil in which the coil is suspended above the outer circumference of the stator lamination. Stator designs often involve periodic teeth in which the magnetic flux is concentrated during operation, and a simple cylindrical coil can act to enhance the localized heating in the vicinity of the teeth through tailoring the details of the induction coil and lamination geometry and manufacturing processes. As an example, FIG. 4*a* illustrates both a surface mounted permanent magnet (left) and internal permanent magnet (right) motor. In all cases, the stator involves periodic teeth in proximity to the motor gap in which the magnetic field strength is strongest at the inner stator diameter during operation. An example illustration of a transverse induction coil thermal process is illustrated in FIG. 4*b*, in which a transverse coil is suspended above the inner diameter of a lamination which can produce a temperature that is a maximum within the teeth of the motor lamination near the inner diameter (where magnetic flux is highest) and decreases near the outer diameter (where magnetic flux is lowest). Because the magnetic flux density is greatest within the teeth, this design enables improved utilization of the motor lamination with lower losses. Through producing peak temperatures during annealing in regions where magnetic flux density is expected greatest, a significant benefit can be provided in terms of loss reductions. In this way, relatively simple coil configurations combined with enhancement of eddy currents and peak temperatures near lamination edges, are used to locally enhance magnetic properties in regions where magnetic flux is concentrated within the stator laminations.

Figures 5A, 5B:
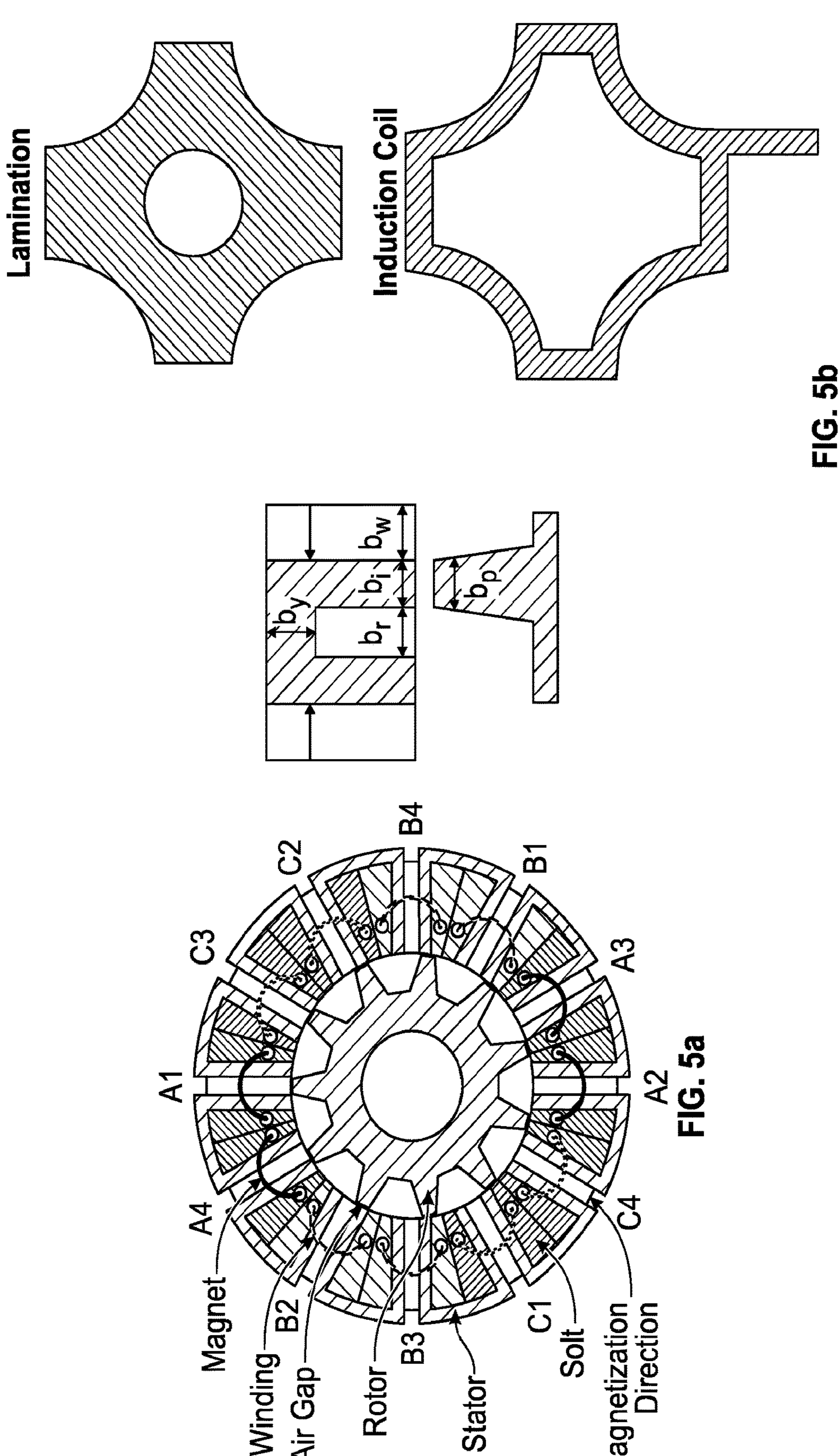
FIG. 5*a* is an image illustrating a flux switching permanent magnet design showing a rotor with a defined tooth geometry.
FIG. 5*b* is a schematic illustrating a rotor lamination design along with an example initial induction coil configuration to promote preferential heating at the outer edges of the laminations with lower peak temperatures near the lamination center, in accordance with certain embodiments of the disclosed concept.
Figure 6:
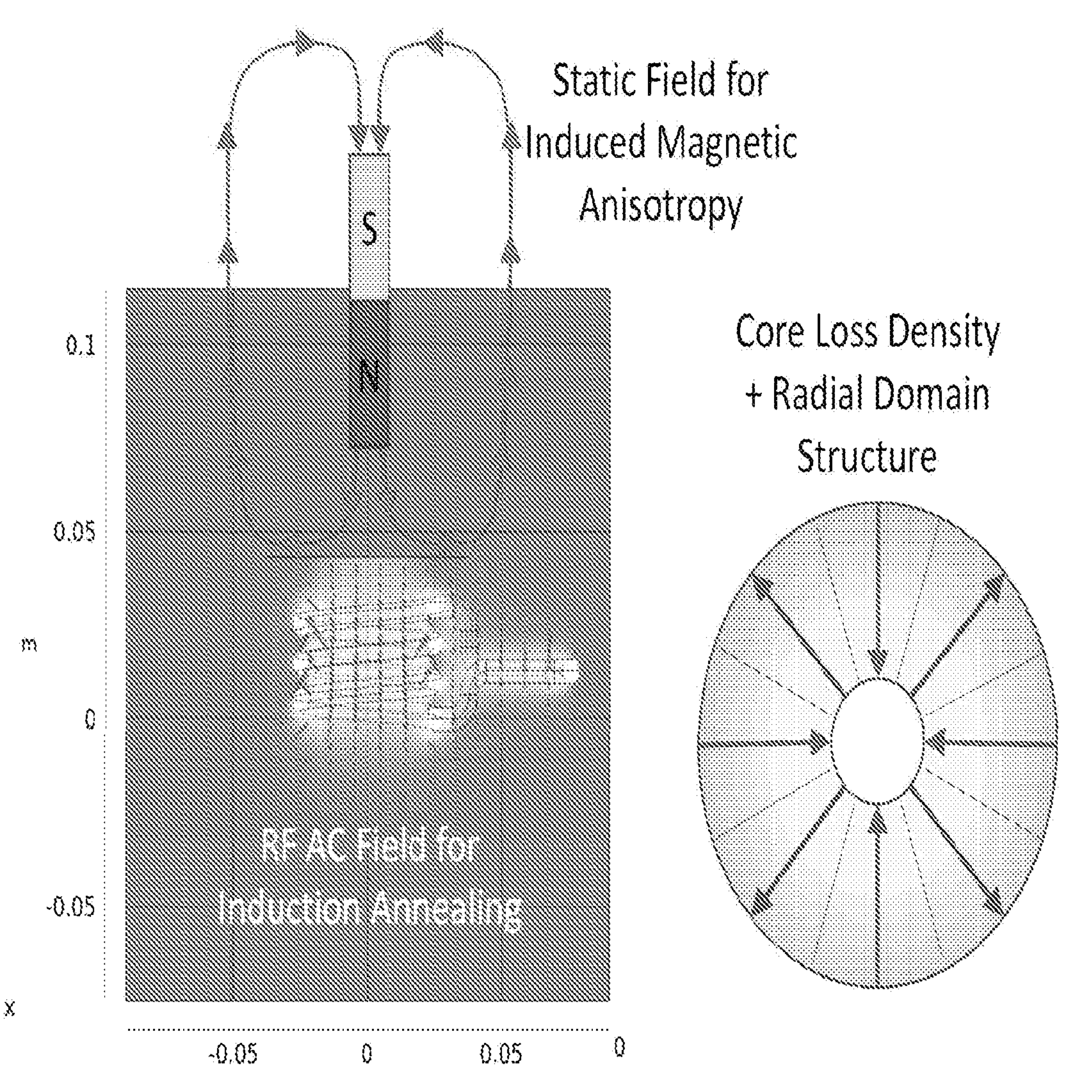
FIG. 6 is an image illustrating a radial field annealing in combination with induction-based annealing to achieve both a spatially varying core loss density and a radial domain structure to optimize the magnetic performance.

3) To a first approximation, the induced eddy current within a monolithic lamination is a mirror image (with a reversed current orientation) of the current within the induction coil used for thermal annealing. As a result, a simple design principle can be used to guide initial coil design for a particular thermal distribution in that the coil current is localized above regions in which the temperature and hence eddy current distribution is largest. More detailed coil designs can be developed using refinement approaches based upon finite element simulations and other applied electromagnetic and thermal modeling methods. For example, a flux switching permanent magnet machine with a rotor geometry having well-defined teeth is illustrated in FIG. 5*a*. A simpler version of a similar rotor is presented in FIG. 5*b* along with an example initial induction coil design taking advantage of preferential heating at sample edges and the mirror images of induced eddy currents on the lamination surfaces. Additional details of design include spatially varying current coil densities rather than a discrete coil density at one location, such that the flux density impinging on the lamination is varied spatially with an optimal distribution for a desired heating profile. Similar design principles are used in a broad range of other potential rotor and stator lamination geometries, and also for other electromagnetic components. Similar design principles can also be applied to axial motor designs.

4) In addition to spatial optimization of thermal heating to affect the balance between mechanical and magnetic properties, additional advantages of thermal processing with an induction coil or other electromagnetic based heating approach includes the ability to introduce magnetic or mechanical applied fields to the part during the thermal processing stage more readily than traditional thermal processing methods. In this way, the soft magnetic lamination is further optimized for achieving minimal losses through tailoring of induced magnetic anisotropies and associated magnetic domain structures. A non-limiting example, a radial magnetic field annealing through a combination of a static magnetic field source (e.g. permanent magnet, electromagnet) and an induction coil processing set-up, is illustrated in FIG. 5. The ultimate outcome of such an approach enables a radial induced magnetic domain structure which further reduces the losses and increases the permeability as compared to standard processed laminates.

In certain embodiments, the disclosed concept includes a thermal processing method that includes providing a component comprising a soft magnetic alloy, and applying spatially selective thermal annealing to the component by applying an electromagnetic field to the component, wherein the electromagnetic field generates heat internally within the component in a spatially varying manner in order to cause a number of magnetic properties and a number of mechanical properties of the soft magnetic alloy to vary spatially within the component. In certain embodiments, the electromagnetic field is an RF field, a microwave field, or an optical field. In certain embodiments, the electromagnetic field is applied through a coil member, such as a helical coil, a split helical coil or a pancake coil. In certain embodiments, the thermal processing method includes a static magnetic field adjacent to and/or an applied mechanical field to the component during at least part of the applying of the electromagnetic radiation to generate induced magnetic anisotropies within the component, which may result in (i) generation of a radial induced anisotropy and an easy axis along a primary direction of gap flux or (ii) generation of a transverse induced anisotropy and an easy axis along a primary direction of gap flux or (iii) generation of a spatially varying induced anisotropy and an easy axis that lies along a primary directions of flux within the component. In certain embodiments of the thermal processing method, the component is a motor lamination, wherein the coil member is a transverse coil suspended above an outer circumference of the lamination, wherein a temperature within the component during the processing is a maximum near the outer diameter of the rotor and decreases approaching an inner diameter of the rotor, and wherein the magnetic and mechanical properties are caused to vary radially. The motor lamination may be a disk-shaped lamination such as in a surface mounted permanent magnet machine (SPM), and the transverse coil may be a cylindrical transverse coil. In other embodiments of the thermal processing method, the component is a motor lamination, wherein the coil member is a transverse coil suspended above an inner circumference of the stator, wherein a temperature within the component during the processing is a maximum near the inner diameter of the stator and decreases approaching an outer diameter of the motor lamination, and wherein the magnetic and mechanical properties are caused to vary radially. The motor lamination may be a periodic tooth shaped stator such as in a surface mounted permanent magnet machine (SPM), an interior mounted permanent magnet machine (IPM), and even an induction machine. The transverse coil may be a cylindrical transverse coil.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the disclosed concept has been described in detail for the purpose of illustration based on what is currently considered to be the most practical and preferred embodiments, it is to be understood that such detail is solely for that purpose and that the disclosed concept is not limited to the disclosed embodiments, but, on the contrary, is intended to cover modifications and equivalent arrangements that are within the spirit and scope of the appended claims. For example, it is to be understood that the present disclosed concept contemplates that, to the extent possible, one or more features of any embodiment can be combined with one or more features of any other embodiment.

What is claimed is:

1. A thermal processing method, comprising:

providing a component comprising a soft magnetic alloy;

applying spatially selective thermal annealing to the component by applying an electromagnetic field to the component, wherein electromagnetic field generates heat internally within the component in a spatially varying manner to cause magnetic properties and mechanical properties of the soft magnetic alloy to vary spatially within the component.

2. The thermal processing method according to claim 1, wherein the electromagnetic field is selected from an RF field, a microwave field, and an optical field.

3. The thermal processing method according to claim 1, wherein the soft magnetic alloy is a bulk crystalline soft magnetic alloy.

4. The thermal processing method according to claim 3, wherein the bulk crystalline soft magnetic alloy is selected from an iron-cobalt soft magnetic alloy and an electrical steel.

5. The thermal processing method according to claim 1, wherein the soft magnetic alloy is in the form of a lamination which is processed prior to stamping or other laminate manufacturing processes such that a radial temperature dependence is preserved during annealing for more complex lamination geometries.

6. The thermal processing method according to claim 1, wherein the component is a part of an electric motor.

7. The thermal processing method according to claim 6, wherein the component is selected from a rotor and a stator.

8. The thermal processing method according to claim 7, wherein the rotor or the stator is a rotor or stator of an electric traction motor of an electric vehicle.

9. The thermal processing method according to claim 1, wherein the electromagnetic field is applied through a coil member.

10. The thermal processing method according to claim 9, wherein the coil member is selected from a helical coil, a split helical coil, and a pancake coil.

11. The thermal processing method according to claim 1, further comprising providing a static magnetic field adjacent to and/or an applied mechanical field to the component during at least part of the applying of electromagnetic radiation to generate induced magnetic anisotropies within the component.

12. The thermal processing method according to claim 1, wherein the component is a rotor, wherein a coil member is a transverse coil suspended above an outer circumference of the rotor, wherein a temperature within the component during the processing is a maximum near an outer diameter of the rotor and decreases approaching an inner diameter of the rotor, and wherein the magnetic and mechanical properties are caused to vary radially.

13. The thermal processing method according to claim 1, wherein the component is a disk-shaped lamination and a transverse coil is a cylindrical transverse coil.

14. The thermal processing method according to claim 1, wherein the component is a stator, wherein a coil member is a transverse coil suspended above an inner circumference of the stator, wherein a temperature within the component during the processing is a maximum near an inner diameter of the stator and decreases approaching an outer diameter of the stator, and wherein the magnetic and mechanical properties are caused to vary radially.

15. The thermal processing method according to claim 1, wherein the component comprises a lamination comprising the soft magnetic alloy.

16. The thermal processing method according to claim 1, wherein the number of magnetic properties include includes core loss and/or permeability and wherein the number of mechanical properties include includes yield strength and/or hardness.

17. The thermal processing method according to claim 9, wherein the coil member is structured such that a coil current in the coil member is localized above one or more regions of the component in which the temperature is to be the largest.

18. The thermal processing method according to claim 17, wherein the one or more regions of the component is selected from include one or more outer edges of the component, one or more inner edges of the component, and teeth of a stator or a rotor.

19. The thermal processing method according to claim 9, wherein the coil member exhibits a spatially varying current coil density.

20. The thermal processing method according to claim 6, wherein the component is part of an axial motor.

* * * * *